United States Patent
Guo et al.

(10) Patent No.: US 9,906,971 B2
(45) Date of Patent: Feb. 27, 2018

(54) AGEING DETECTION METHOD AND DEVICE

(71) Applicant: ZTE CORPORATION, Shenzhen (CN)

(72) Inventors: Hongyan Guo, Shenzhen (CN); Shaojun Huang, Shenzhen (CN); Haiyan Jin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/321,155

(22) PCT Filed: Oct. 22, 2014

(86) PCT No.: PCT/CN2014/089219
§ 371 (c)(1),
(2) Date: Dec. 21, 2016

(87) PCT Pub. No.: WO2015/196661
PCT Pub. Date: Dec. 30, 2015

(65) Prior Publication Data
US 2017/0164223 A1    Jun. 8, 2017

(30) Foreign Application Priority Data

Jun. 23, 2014  (CN) .......................... 2014 1 0282941

(51) Int. Cl.
*H04W 24/06* (2009.01)
*H04L 12/26* (2006.01)
(Continued)

(52) U.S. Cl.
CPC ............. *H04W 24/06* (2013.01); *G06F 11/07* (2013.01); *G06F 11/2273* (2013.01);
(Continued)

(58) Field of Classification Search
CPC ......... H04B 17/15; H04B 17/29; H04L 43/08; H04L 43/16; H04L 43/50; H04W 24/04; H04W 24/06; G06F 11/07; G06F 11/2273
See application file for complete search history.

(56) References Cited

U.S. PATENT DOCUMENTS

2007/0291727 A1* 12/2007 Hellum ..................... G06F 8/67
                                                          370/345
2013/0179538 A1  7/2013 Dutta et al.
2013/0288610 A1* 10/2013 Toh ....................... H03G 3/3042
                                                          455/67.14

FOREIGN PATENT DOCUMENTS

CN   101651569    2/2010
CN   101848120    9/2010
(Continued)

OTHER PUBLICATIONS

Extended European Search Report for European Application No. EP 14896016.4, Completed by the European Patent Office, dated May 24, 2017, 7 Pages.
(Continued)

*Primary Examiner* — Charles Appiah
*Assistant Examiner* — Margaret G Mastrodonato
(74) *Attorney, Agent, or Firm* — Plumsea Law Group, LLC

(57) ABSTRACT

An ageing detection method and device are disclosed. The method includes: when a preset temperature environment is reached, constructing a message by testing a LAN port, and performing a statistics operation on received packets and transmitted packets, so as to determine a high-temperature dynamic ageing detection result under a data service test; performing a simulated call protocol flow operation by testing a voice service, so as to determine a high-temperature dynamic ageing detection result under a voice service test; and detecting a Beacon frame by testing a WLAN service,
(Continued)

so as to determine a high-temperature dynamic ageing detection result under a WLAN service test.

17 Claims, 5 Drawing Sheets

(51) Int. Cl.
    *G06F 11/22*      (2006.01)
    *H04B 17/29*      (2015.01)
    *G06F 11/07*      (2006.01)
    *H04W 24/04*      (2009.01)
    *H04B 17/15*      (2015.01)

(52) U.S. Cl.
    CPC ............. *H04B 17/15* (2015.01); *H04B 17/29* (2015.01); *H04L 12/26* (2013.01); *H04L 43/08* (2013.01); *H04L 43/50* (2013.01); *H04W 24/04* (2013.01)

(56) References Cited

FOREIGN PATENT DOCUMENTS

| | | |
|---|---|---|
| CN | 103441899 | 12/2013 |
| CN | 103795579 | 5/2014 |
| WO | 0116747 | 3/2001 |

OTHER PUBLICATIONS

Madren et al. XP 055373067, Energize Oct. 1, 2005, pp. 30-32, "Ethernet: getting tough on temperature?".
International Search Report for PCT/CN14/089219, English Translation attached to original, Both completed by the Chinese Patent Office dated Jan. 7, 2016, All together 5 Pages.

\* cited by examiner

AGEING DETECTION METHOD AND DEVICE

CROSS-REFERENCE TO RELATED APPLICATION

This application is the U.S. national phase of PCT Application No. PCT/CN2014/089219 filed Oct. 22, 2014 which claims priority to Chinese Application No. 201410282941.9 filed Jun. 23, 2014, the disclosures of which are incorporated in their entirety by reference herein.

TECHNICAL FIELD

The present document relates to the field of communications, and particularly, to an ageing detection method and device.

BACKGROUND

In a manufacturer link, terminal products do not involve the aspect of dynamic high-temperature tooling ageing test in the existing tests, only the flow test is simply tested. But in the process of using a single board, the temperature of the single board will be gradually raised, and when a certain temperature is reached, problems such as insufficient soldering of the hardware circuit may be exposed. However, it has basically belonged to a commercial link at this point, thus a repair rate of the single board may be improved.

With respect to the problem of a higher repair rate of the single board in the existing technology, no effective solution has been proposed at present.

SUMMARY

With respect to the problem of a higher repair rate of the single board in the existing technology, the embodiments of the present document provide an ageing detection method and a device, to solve the above technical problem.

According to one aspect of the present document, the present document provides an ageing detection method, herein, the high-temperature dynamic ageing detection method includes: when a preset temperature environment is reached, constructing a message by testing a Local Area Network, LAN, port, and performing a statistics operation on received packets and transmitted packets to determine a high-temperature dynamic ageing detection result under a data service test; performing a simulated call protocol flow operation by testing a voice service to determine a high-temperature dynamic ageing detection result under a voice service test; and detecting a Beacon frame by testing a Wireless Local Area Networks, WLAN, service to determine a high-temperature dynamic ageing detection result under a WLAN service test.

Alternatively, constructing a message by testing a LAN port, and performing a statistics operation on received packets and transmitted packets includes: constructing a message with a fixed mac address; sending the message at every specified duration, and making a packet statistics for received packets and transmitted packets of the message in the meantime; if the received packets and transmitted packets of the message in the statistics for a current time are unequal, determining that a test is failed within the specified duration; and if the detection is failed for a first specified number of times in succession, determining that a high-temperature dynamic ageing LAN port detection for the current time is failed.

Alternatively, performing a simulated call protocol flow operation by testing a voice service includes: looping two plain old telephone service, pots, ports; herein, the two pots ports are a pots1 port and a pots2 port, the pots1 port and the pots2 port alternately sends or receives a serial number; in a case that the pots1 port sends a serial number and the pots2 port receives the serial number, if the serial number received by the pots2 port is entirely matched with an order and a number value of a serial number sent by the pots1 port, determining that the test for the current time is successful, and if the serial number received by the pots2 port is not entirely matched with the order and the number value of the serial number sent by the pots1 port, determining that the test for the current time is failed; and if the detection is failed for a second specified number of times in succession, determining that a high-temperature dynamic ageing detection for the current time is failed.

Alternatively, detecting a Beacon frame by testing a WLAN service includes: scanning the Beacon frame; if the Beacon frame is detected normally, determining that a high-temperature dynamic ageing detection for a current time is successful; and if the Beacon frame is not detected for a third specified number of times in succession, determining that the high-temperature dynamic ageing detection for the current time is failed.

Alternatively, the method further includes: in a high-temperature dynamic ageing detection process, a network E light ceaselessly flickering; after the high-temperature dynamic ageing detection ends, the network E light being always on, and an optical signal light being off to indicate that the high-temperature dynamic ageing detection result is a success; and after the high-temperature dynamic ageing detection ends, the optical signal light being always on to indicate that the high-temperature dynamic ageing detection result is a failure.

According to another aspect of the present document, the present document further provides an ageing detection device, herein, the device includes: a data service test module, arranged to: when a preset temperature environment is reached, construct a message by testing a Local Area Network, LAN, port, and perform a statistics operation on received packets and transmitted packets to determine a high-temperature dynamic ageing detection result under a data service test; a voice service test module, arranged to: perform a simulated call protocol flow operation by testing a voice service to determine a high-temperature dynamic ageing detection result under a voice service test; and a WLAN service test module, used to: detect a Beacon frame by testing a Wireless Local Area Networks, WLAN, service to determine a high-temperature dynamic ageing detection result under a WLAN service test.

Alternatively, the data service test module includes: a message construction unit, arranged to construct a message with a fixed mac address; a message sending unit, arranged to: send the message at every specified duration, and make a statistics for received packets and transmitted packets of the message in the meantime; and a first test determination unit, arranged to: in a case that the received packets and transmitted packets of the message in the statistics for a current time are unequal, determine that a test is failed within the specified duration; and in a case that the detection is failed for a first specified number of times in succession, determine that a high-temperature dynamic ageing LAN port detection for the current time is failed.

Alternatively, the voice service test module includes: a processing unit, arranged to loop two plain old telephone service, pots, ports; herein, the two pots ports are a pots1 port and a pots2 port, the pots1 port and the pots2 port alternately sends or receives a serial number; and a second test determination unit, arranged to: in a case that the pots1 port sends a serial number and the pots2 port receives the serial number, if the serial number received by the pots2 port is entirely matched with an order and a number value of a serial number sent by the pots1 port, determine that the test for a current time is successful, and if the serial number received by the pots2 port is not entirely matched with the order and the number value of the serial number sent by the pots1 port, determine that the test for the current time is failed; and if the detection is failed for a second specified number of times in succession, determine that a high-temperature dynamic ageing detection for a current time is failed.

Alternatively, the WLAN service test module includes: a frame scanning unit, arranged to scan a Beacon frame; and a third test determination unit, arranged to: in a case that the Beacon frame is detected normally, determine that a high-temperature dynamic ageing detection for a current time is successful; and in a case that the Beacon frame is not detected for a third specified number of times in succession, determine that the high-temperature dynamic ageing detection for a current time is failed.

Alternatively, the device further includes: in a high-temperature dynamic ageing detection process, a network E light ceaselessly flickering; after the high-temperature dynamic ageing detection ends, the network E light being always on, and an optical signal light being off, to indicate that the high-temperature dynamic ageing detection result is a success; and after the high-temperature dynamic ageing detection ends, the optical signal light being always on to indicate that the high-temperature dynamic ageing detection result is a failure.

In the embodiments of the present document, in order to reduce the repair rate of the single board, in the ex-factory link, a dynamic high-temperature tooling process is added, and it is required to automatically test a data service, a voice service and a WLAN service in high-temperature environments. It is aimed at achieving the elimination of hardware insufficient soldering and light emitting diode (LED) light damage and the guarantee of normal basic data and voice service flows in the production link, and enhancing the production efficiency and quality. Thus the test reliability is improved, which can better intercept a defective single board and reduce the repair rate of the single board. Therefore, the cost is saved, and the quality of products is improved.

The above description is only a summary of the technical scheme of the present document, in order to be able to understand the technological means of the present document more clearly, it can be executed in accordance with the summary of the invention, and in order to make the above and other objects, characteristics and advantages of the present document more clear and easy to understand, the specific embodiments of the present document are especially illustrated below.

PREFERRED EMBODIMENTS OF THE INVENTION

The present document will be described in detail in combination with the accompanying drawings and specific embodiments below. It should be noted that the embodiments in the present document and the characteristics in the embodiments can be combined with each other in the case of no conflict.

For the factory, 1) due to the influence of objective factors, the requirement on the process flow is much stricter, adding one working process will greatly affect the production efficiency of the production line, which decides that the process of dynamic high-temperature tooling must be concise.

2) if a complicated networking environment is required, it is a kind of burden for the factory.

3) a detection result should be visualized, thus it can be simple for the production line staff to understand and be more beneficial to promotion, and there must be corresponding information to prompt the cause of detection failure to the manufacturers in the meantime.

4) it is a double-edged sword for the judgment criterion of the detection, if a zero fault tolerance is given to the products, it may lead to a lower passing rate of the products, and cause that the manufacturers are in no mood for action. Since the data services and wireless services all have a certain packet loss in a normal environment, for the voice services, the signal distortion is more common. It should consider appropriately relaxing a threshold value of various services. Not only the defective products can be detected, but also the possibility of false detection is reduced.

5) the detection parameters are configurable as far as possible, thus the manufacturers can control the test duration, so as to enhance the production efficiency of the products.

In conclusion, that kind of situation should be completely eradicated on the production line, the process is added as less as possible, the networking environment is simple, the judgment threshold is slightly relaxed, the test duration is configurable, the detection result is visually displayed, and there is a detailed detection failure log at the same time. Thus the manufacturers' and equipment detection traders' confidence in the practice can be improved, which is beneficial for promoting the practice. Therefore, the embodiments of the present document provide a high-temperature dynamic ageing detection method and device for batch terminal products.

In order to reduce the repair rate of the single board, in the ex-factory link, a dynamic high-temperature tooling process is added, and it is required to automatically test a data service, a voice service and a WLAN service in high-temperature environments. Specifically, a LAN side service constructs a message to perform a transceiving statistics; a voice service performs a simulated call protocol flow; and a WLAN module detects a Beacon frame. Detailed descriptions will be made through the embodiments below.

Figure 1:
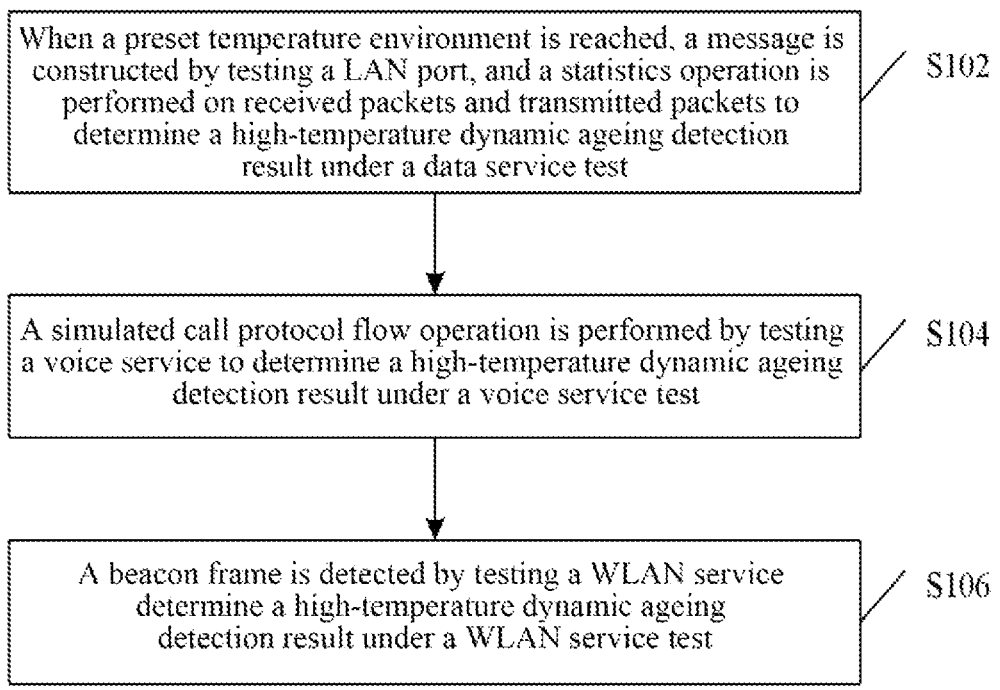
FIG. 1 is a flow chart of an ageing detection method according to the embodiment of the present document.

The embodiment provides an ageing detection method, FIG. 1 is a flow chart of an ageing detection method according to the embodiment of the present document, and as shown in FIG. 1, the ageing detection method includes the following steps (step S102~step S106):

In step S102, when a preset temperature environment is reached, a message is constructed by testing a LAN port, and a packet statistics operation is performed on receiving packets and transmitted packets, so as to determine a high-temperature dynamic ageing detection result under a data service test. Herein, the above preset temperature is a high-temperature environment, and it can be determined according to a maximum value of the working temperature of the single board. The specific temperature value can be adaptively adjusted according to the actual operation.

In step S104, a simulated call protocol flow operation is performed by testing a voice service, so as to determine a high-temperature dynamic ageing detection result under a voice service test.

In step S106, a Beacon frame is detected by testing a WLAN service, so as to determine a high-temperature dynamic ageing detection result under a WLAN service test.

In the step S102 of the embodiment, constructing a message by testing a LAN port, and performing a statistics operation on received packets and transmitted packets includes: constructing a message with a fixed mac address; sending the message at every specified duration, and making a statistics on the received packets and transmitted packets of the message in the meantime; if the received packets and transmitted packets of the message in the statistics for the message of a current time are unequal, determining that a test is failed within the specified duration; and if the detection is failed for a first specified number of times in succession, determining that a high-temperature dynamic ageing LAN port detection for the current time is failed. Herein, the message with the fixed mac address can be a two-layer multicast message with a target address beginning with 01:80:C2.

In the step S104 of the embodiment, performing a simulated call protocol flow operation by testing a voice service includes: looping two pots ports; herein, the two pots ports are a pots1 port and a pots2 port, the pots1 port and the pots2 port alternately sends or receives a serial number; in a case that the pots1 port sends a serial number and the pots2 port receives the serial number, if the serial number received by the pots2 port is entirely matched with an order and a number value of a serial number sent by the pots1 port, determining that the test of the current time is successful, and if the serial number received by the pots2 port is not entirely matched with the order and the number value of the serial number sent by the pots1 port, determining that the test for the current time is failed; and if the detection is failed for a second specified number of times in succession, determining that a high-temperature dynamic ageing detection for the current time is failed.

In the step S106 of the embodiment, detecting a Beacon frame by testing a WLAN service includes: scanning the Beacon frame; if the Beacon frame is detected normally, determining that a high-temperature dynamic ageing detection for the current time is successful; and if the Beacon frame is not detected for a third specified number of times in succession, determining that the high-temperature dynamic ageing detection for the current time is failed.

Moreover, in the actual operation process of the embodiment, the detection process and the detection result can be indicated through an indicator light. Alternatively, in a high-temperature dynamic ageing detection process, a network E light ceaselessly flickers; after the high-temperature dynamic ageing detection ends, the network E light is always on, and an optical signal light is off, so as to indicate that the high-temperature dynamic ageing detection result is a success; and after the high-temperature dynamic ageing detection ends, the optical signal light is always on, so as to indicate that the high-temperature dynamic ageing detection result is a failure.

In the technical scheme of the embodiments of the present document, a main idea of the method for dynamically detecting the batch terminal products is to construct a message according to the LAN side service to perform transceiving statistics. The voice service performs a simulated call protocol flow, and the WLAN module detects a Beacon frame. Thus the data service, the voice service and the WLAN service are automatically tested for the batch terminal products in high-temperature environments.

According to the solving ideas, the following scheme is adopted in the embodiments of the present document:

(1) A LAN port is tested, the LAN port is self-looped, a message with a fixed mac address is constructed and sent so as to perform a statistics on received packets and transmitted packets, the message is sent every two seconds, the number of messages is approximately 10 messages, message statistics is performed in the meantime, and if the statistics for the received packets and transmitted packets of the message for the current are unequal, it is believed that the detection is failed within the two seconds. If the detection is failed for three times in succession, it is believed that the test is failed within the five minutes. Thus it is believed that the high-temperature dynamic ageing LAN port test of this time is failed.

A LAN port loopback test module mainly carries out the following actions:

accepting a start command and parameters of a management module, and starting a packet self-receiving and self-transmitting test;

making the statistics for the maximum number of times of continuous errors and the number of times of accumulated errors in real time;

if there is a packet loss or a packet error, writing an error log file, and continuing the test;

after receiving a stop command of the management module, stopping the test; and after the test is stopped, making statistics of the following information and reporting the information to the management module, herein the information about whether the tests of the 5 minutes are all OK or partly have the packet loss or all have the packet loss and so on is included.

The information for which the statistics is required includes: the total number of times of accumulated tests, the number of times of accumulated successful tests, the number of times of accumulated failed tests, the number of accumulated sent packets, the number of times of accumulated packet losses, the number of accumulated packet errors, and whether it is partial-packet-loss or all-packet-loss.

Figure 2:
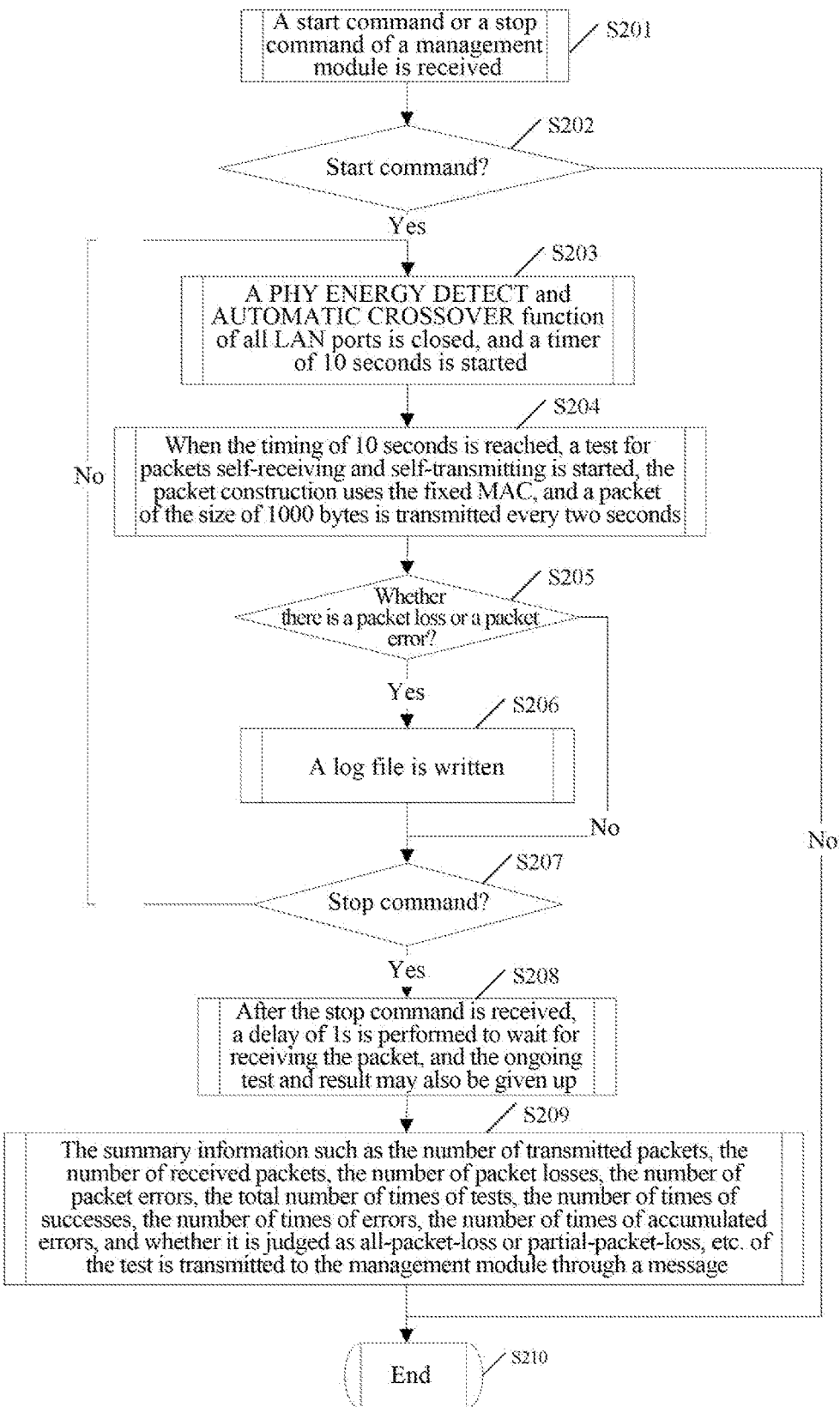
FIG. 2 is a flow chart of the LAN port detection according to the embodiment of the present document.

FIG. 2 is a flow chart of the LAN port detection according to the embodiment of the present document, and as shown in FIG. 2, the flow includes the following steps:

In step S201, a start command or a stop command of a management module is received;

In step S202, it is to judge whether it is the start command, if it is the start command, step S203 is executed, and if it is not the start command, step S210 is executed;

In step S203, a PHY ENERGY DETECT and AUTOMATIC CROSSOVER function of all LAN ports is closed, and at same time, a timer of 10 seconds is started;

In step S204, when the timing of 10 seconds reaches, a test of packet self-receiving and self-transmitting is started, the construction of the packet uses the fixed MAC, such as a multicast type packet beginning with 01:80:C2, and a packet of the size of 1000 bytes is sent every two seconds;

In step S205, it is to judge whether there is a packet loss or a packet error, if there is the packet loss or the packet error, step S206 is executed, and if there is no packet loss or no packet error, step S207 is executed;

In step S206, a log file is written;

In step S207, it is to judge whether it is the stop command, if it is the stop command, step S208 is executed, and if it is not the stop command, step S203 is executed;

In step S208, after the stop command is received, a delay of 1 s is performed to wait for receiving the packet, and the ongoing test and result may also be given up;

In step S209, the summary information such as the number of transmitted packets, the number of received packets, the number of lost packets, the number of error packets, the total number of times of tests, the number of times of successes, the number of times of errors, the number of times of accumulated errors, and whether it is judged as all-packet-loss or partial-packet-loss, etc. of the test is sent to the management module through a message;

In step S210, the flow ends.

(2) A VOW service is tested, two pots ports are looped, the pots ports alternately send and receive a serial number so as to perform number matching. The pots1 port sends a series of serial numbers such as 0 1 2 3 4 5 6 7 8 9 # *, and the pots2 port receives the number, if the received number is entirely matched with an order and a number value of the serial number sent by the pots1 port, it is believed that the test is successful, and if the received number is not entirely matched with the order and the number value of the serial number sent by the pots1 port, it is believed that the test is failed. If it is failed for three times in succession, it is believed that the high-temperature dynamic ageing of this time is failed.

A POTS port test module mainly carries out the following actions:

accepting a start command and various parameters of a management module, and starting sending a Dual Tone Multi Frequency (DTMF) flow to perform testing;

making the statistics for the maximum number of times of continuous errors in real time;

if a packet loss or a packet error occurs, writing an error log, and continuing the test;

after receiving a stop command of the management module, stopping the test; and after the test is stopped, making the statistics for the following information and reporting the information to the management module.

The information for which the statistics is required includes: the total number of times of accumulated tests, the number of times of accumulated successful tests, the number of times of accumulated failed tests, the number of times of accumulated bit errors, the number of times of accumulated packet losses, and whether it is partial-packet-loss or all-packet-loss.

Figure 3:
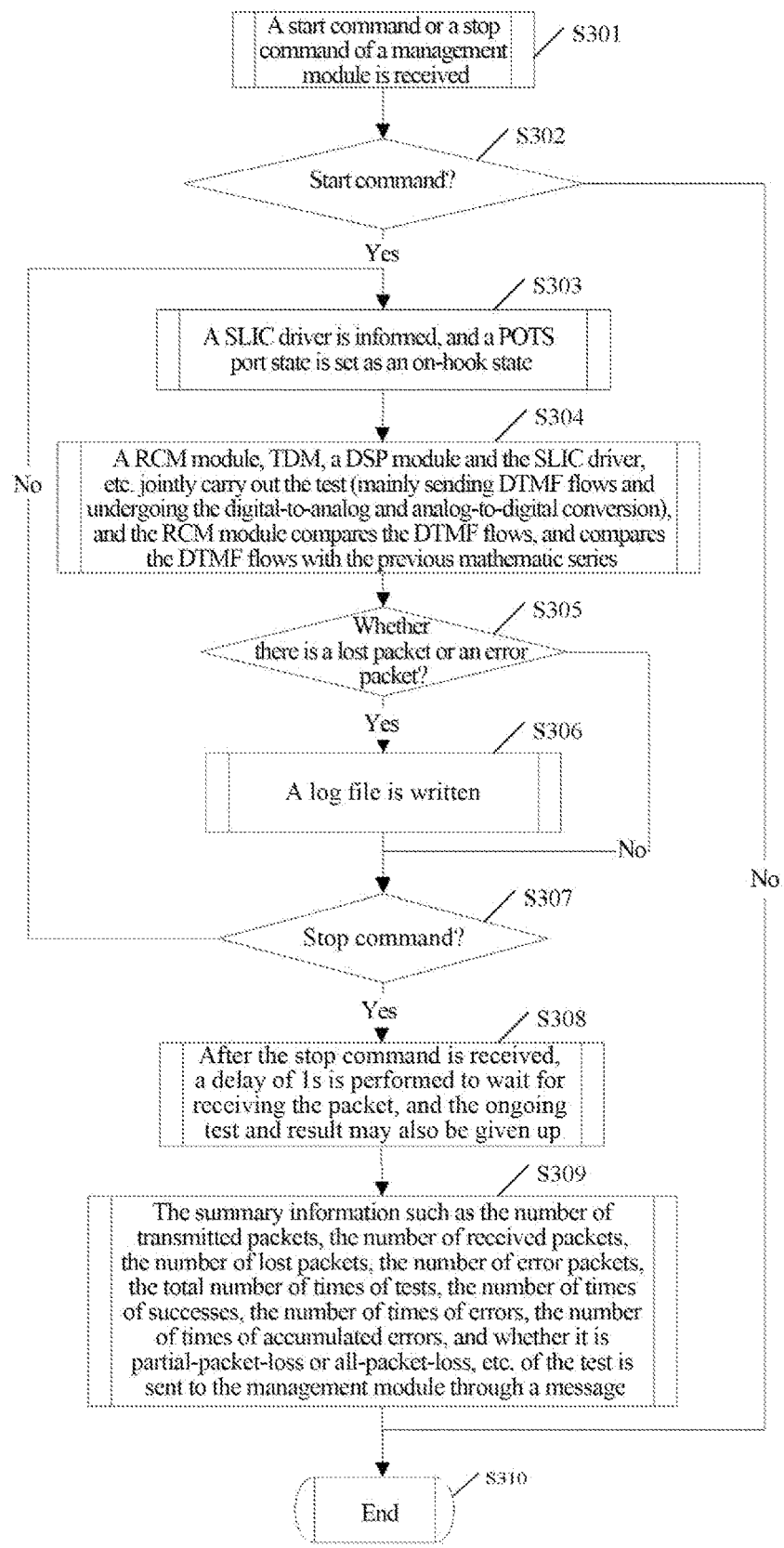
FIG. 3 is a flow chart of the POTS port detection according to the embodiment of the present document.

FIG. 3 is a flow chart of the POTS port detection according to the embodiment of the present document, and as shown in FIG. 3, the flow includes the following steps:

In step S301, a start command or a stop command of a management module is received;

In step S302, it is to judge whether it is the start command, if it is the start command, step S303 is executed, and if it is not the start command, step S310 is executed;

In step S303, a Software Licensing Internal Code (SLIC) driver is informed, and a POTS port state is set as an on-hook state;

In step S304, a flexible manufacturing cell and automatic control scheduling system (RCM) module, Time Division Multiplexing (TDM), a Digital Signal Process (DSP) module and the SLIC driver, etc. jointly carry out the test (mainly sending DTMF flows and undergoing the digital-to-analog and analog-to-digital conversion), and the RCM module compares the DTMF flows, and compares the DTMF flows with the previous mathematic series;

In step S305, it is to judge whether there is a packet that is lost or an error packet, if there is the packet that is lost or the error packet, step S306 is executed, and if there is no packet that is lost or no error packet, step S307 is executed;

In step S306, a log file is written;

In step S307, it is to judge whether it is the stop command, if it is the stop command, step S308 is executed, and if it is not the stop command, step S303 is executed;

In step S308, after the stop command is received, a delay of 1 s is performed to wait for receiving the packet, and the ongoing test and result may also be given up;

In step S309, the summary information such as the number of transmitted packets, the number of received packets, the number of lost packets, the number of error packets, the total number of times of tests, the number of times of successes, the number of times of errors, the number of times of accumulated errors, and whether it is partial-packet-loss or all-packet-loss, etc. of the test is sent to the management module through a message;

In step S310, the flow ends.

(3) A WLAN service is tested, a (Wireless) Access Point (AP) is placed close to a high-temperature machine room, and then a single board will scan a Beacon frame in a dynamic ageing test process, if the single board can normally detect the Beacon frame, it is believed that the dynamic ageing of this time is successful, and if the Beacon frame cannot be detected for three times in succession, it is believed that a wireless module has a fault, and the dynamic ageing of this time is failed.

A WiFi test module mainly carries out the following actions:

accepting a start command and various parameters of a management module, and starting performing a Beacon frame scanning test;

making the statistics for the maximum number of times of continuous errors in real time;

if the Beacon frame cannot be scanned, writing an error log, and continuing the test;

after receiving a stop command of the management module, stopping the test; and after the test is stopped, making the statistics for the following information and reporting the information to the management module.

The information for which statistics is required includes: the total number of times of accumulated tests, the number of times of accumulated successful tests, the number of times of accumulated failed tests, the number of times of accumulated bit errors, the number of times of accumulated packet losses, and whether it is partial-packet-loss or all-packet-loss.

Figure 4:
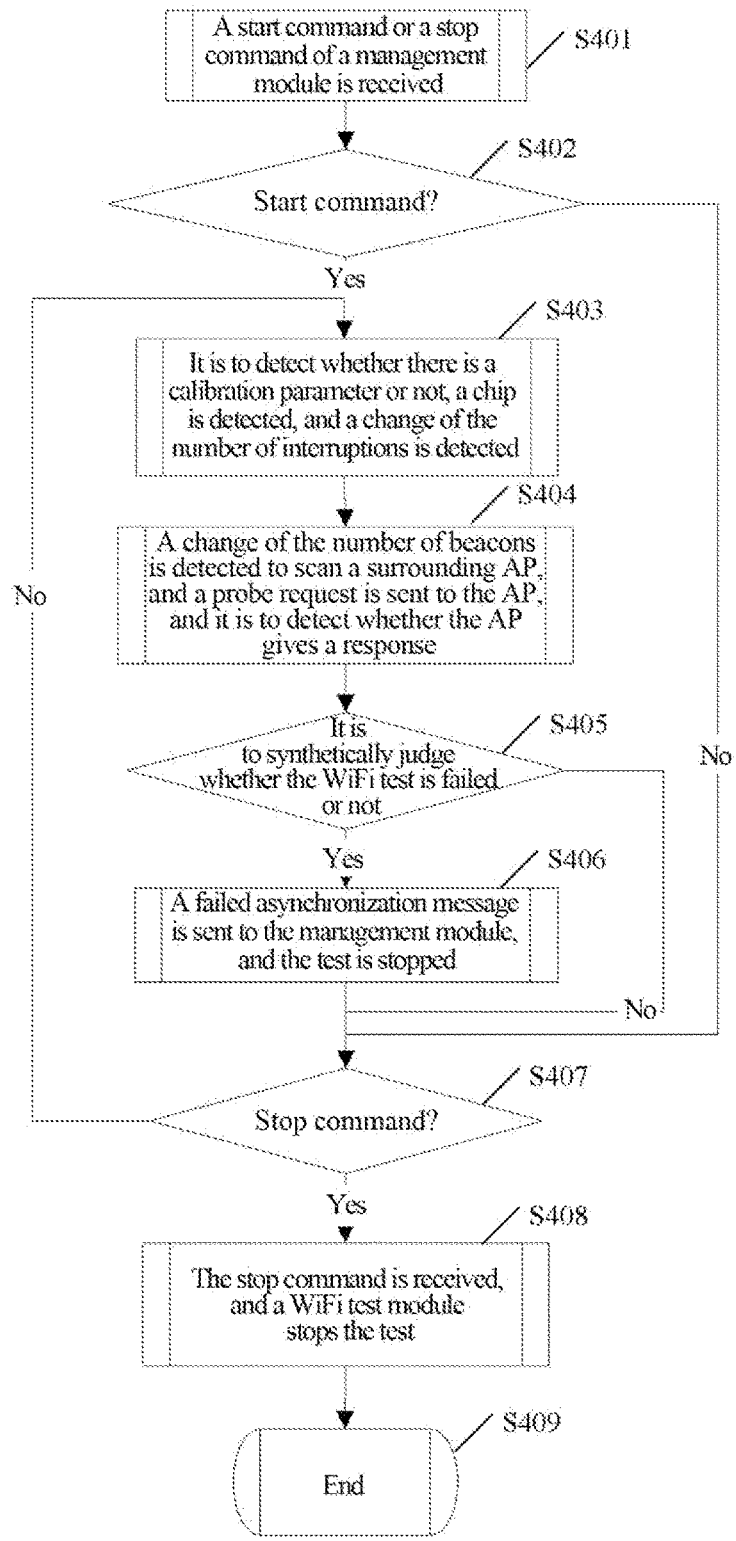
FIG. 4 is a flow chart of the WiFi detection according to the embodiment of the present document.

FIG. 4 is a flow chart of the WiFi detection according to the embodiment of the present document, and as shown in FIG. 4, the flow includes the following steps:

In step S401, a start command or a stop command of a management module is received;

In step S402, it is to judge whether it is the start command, if it is the start command, step S403 is executed, and if it is not the start command, step S407 is executed;

In step S403, it is to detect whether there is a calibration parameter or not, a chip is detected, and a change of the number of interruptions is detected;

In step S404, a change of the number of beacons is detected to scan a surrounding AP, and a probe request is sent to the AP, and it is to detect whether the AP gives a response;

In step S405, it is to synthetically judge whether the WiFi test is failed or not, if the WiFi test is failed, step S406 is executed, and if the WiFi test is not failed, step S407 is executed;

In step S406, a failed asynchronization message is sent to the management module, and the test is stopped;

In step S407, it is to judge whether it is the stop command, if it is the stop command, step S408 is executed, and if it is not the stop command, step S403 is executed;

In step S408, the stop command is received, and a WiFi test module stops the test;

In step S409, the flow ends.

Figure 5:
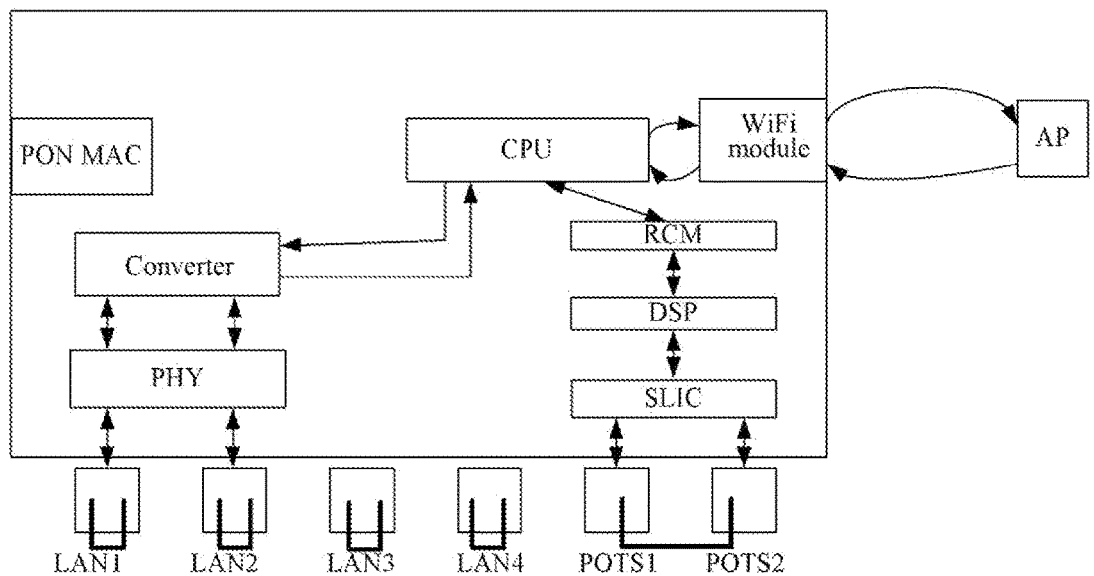
FIG. 5 is a schematic diagram of a data flow direction in the entire test process according to the embodiment of the present document.

FIG. 5 is a schematic diagram of a data flow direction in the entire test process according to the embodiment of the present document, in FIG. 5, red marks a flow direction of a LAN port detection packet, and it starts from a LAN1 port, reaches a Central Processing Unit (CPU) via a switch chip, and then reaches a LAN2 port via the switch chip from the CPU. Blue marks a flow direction of a POTS port detection packet, and it starts from a POTS1 port, reaches the CPU via the SLIC, DSP and RCM, and then reaches a POTS2 port via the RCM, DSP and SLIC from the CPU. Green is a flow direction of a WiFi detection packet, a wireless detection signal sent from an AP reaches the CPU via a WiFi module of the device, and then reaches the AP via the WiFi module from the CPU.

Figure 6:
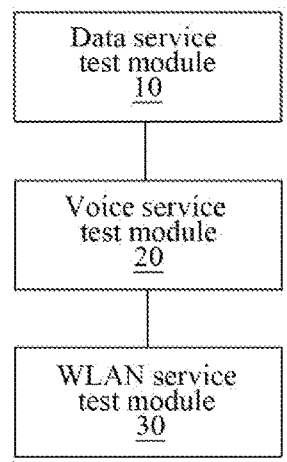
FIG. 6 is a block diagram of a structure of an ageing detection device according to the embodiment of the present document.

Corresponding to the high-temperature dynamic ageing detection method for the batch terminal products introduced in the above embodiment, the embodiment provides a high-temperature dynamic ageing detection device for batch terminal products, the device is arranged to implement the above embodiment. FIG. 6 is a block diagram of a structure of an ageing detection device according to the embodiment of the present document, and as shown in FIG. 6, the device includes: a data service test module 10, a voice service test module 20 and a WLAN service test module 30. The structure will be introduced in detail below.

The data service test module 10 is arranged to: when a preset temperature environment is reached, construct a message by testing a LAN port, and perform a statistics operation on received packets and transmitted packets, so as to determine a high-temperature dynamic ageing detection result under a data service test;

the voice service test module 20, connected to the data service test module 10, is arranged to: perform a simulated call protocol flow operation by testing a voice service, so as to determine a high-temperature dynamic ageing detection result under a voice service test; and the WLAN service test module 30, connected to the voice service test module 20, is arranged to: detect a Beacon frame by testing a WLAN service, so as to determine a high-temperature dynamic ageing detection result under a WLAN service test.

Specifically, the data service test module 10 includes: a message construction unit, arranged to construct a message with a fixed mac address; a message sending unit, arranged to: send the message every specified duration, and make a statistics for received packets and transmitted packets of the message in the meantime; and a first test determination unit, arranged to: in a case that the received packets and the transmitted packets of the message in the statistics for the current time are unequal, determine that a test within the specified duration is failed; and in a case that the detection is failed for a first specified number of times in succession, determine that a high-temperature dynamic ageing LAN port detection of this time is failed.

Alternatively, the voice service test module 20 includes: a processing unit, arranged to loop two pots ports; herein, the two pots ports are a pots1 port and a pots2 port, the pots1 port and the pots2 port alternately sends or receives a serial number; and a second test determination unit, configured to: in a case that the pots1 port sends a serial number and the pots2 port receives the serial number, if the serial number received by the pots2 port is entirely matched with an order and a number value of the serial number sent by the pots1 port, determine that the test of the current time is successful, and if the serial number received by the pots2 port is not entirely matched with the order and the number value of the serial number sent by the pots1 port, determine that the test for the current time is failed; and if the detection is failed for a second specified number of times in succession, determine that a high-temperature dynamic ageing detection for the current time is failed.

Alternatively, the WLAN service test module 30 includes: a frame scanning unit, arranged to scan the Beacon frame; and a third test determination unit, arranged to: in a case that the Beacon frame is detected normally, determine that a high-temperature dynamic ageing detection of this time is successful; and in a case that the Beacon frame is not detected for a third specified number of times in succession, determine that the high-temperature dynamic ageing detection of this time is failed.

In the embodiment, in a high-temperature dynamic ageing detection process, a network E light ceaselessly flickers; after the high-temperature dynamic ageing detection ends, the network E light is always on, and an optical signal light is off, so as to indicate that the high-temperature dynamic ageing detection result is a success; and after the high-temperature dynamic ageing detection ends, the optical signal light is always on, so as to indicate that the high-temperature dynamic ageing detection result is a failure.

The technical scheme of the embodiments of the present document can be promoted in the factory as follows.

1) No Process is Added.

The version is burnt and placed in a high temperature room, and the single board is powered on to automatically enter a dynamic high-temperature ageing process.

After the single board is powered on, if it is not wished to directly enter the high-temperature tooling, a dynamic high-temperature ageing mode can be exited only by the telnet executing setmac 1 2193 0 on the single board.

After the detection is failed, if it is wished to reenter the dynamic high-temperature tooling, the ageing process can be reentered just by the telnet executing setmac 1 2193 1 on the single board.

2) Simple Networking Environment

The single board is only required to insert a power source, a LAN port self-loop line and a voice port self-loop line. The dynamic ageing process is entered.

3) Visual Display of Detection Result

The detection result is clear at a glance, in an ageing process of the first five minutes, it is only to verify whether all LED lights have a damage. If there is no damage, all the lights on the single board are lightened. The process of the factory originally needing to test all the lights on the single board is saved.

After the first five minutes end, the single board automatically reboots, and enters an ageing process of the second five minutes, from the following test process to the end of the test:

the network E light ceaselessly flickers in the detection process, so as to prompt the worker that the high-temperature ageing process is ongoing;

after the detection ends, if the network E light is always on and the optical signal light is off, it represents that the ageing process ends, and the detection result is normal;

in the detection process, if the optical signal light is always on (red), it alerts the worker that the detection is failed in the high-temperature ageing process.

4) Detailed Log Information

The log information may help the manufacturers to locate a reason for the detection failure.

The data detection may prompt how many lost packets and error packets with respect to received packets and transmitted packets of a specific LAN port.

The voice detection will prompt what are respectively the sent number and the received number, and it may determine whether it is completely not receiving a number or only part of numbers are received.

The wireless detection may prompt whether the Beacon frame can be scanned normally.

5) Flexible Parameter Setting, and Control of the Test Duration, Test Items and Test Threshold The manufacturers can flexibly control parameters such as test items, a test duration, a test threshold and a port of the packet sending end of the LAN port and so on, and the detection parameters can be customized according to the actual demands, which improves the production efficiency.

By implementing the high-temperature dynamic ageing test, the test reliability can be improved, which can better intercept a defective single board and reduce the repair rate of the single board. The cost is saved, and the quality of products is improved.

The automatic flow detection for the batch terminals is achieved in the high temperature room, hundreds of terminal devices simultaneously operate automatically, each device is informed whether there is a fault by means of lighting, with respect to a faulted device, it is to analyze whether a large number of the same kind of faults exists by recording, so as to monitor whether insufficient soldering of the hardware circuit exists, and whether there is a chip batch problem and so on.

In the present document, in order to reduce the repair rate of the single board, in the ex-factory link, a dynamic high-temperature tooling process is increased, and it is required to automatically test a data service, a voice service and a WLAN service in high-temperature environments. It is aimed at achieving the elimination of hardware insufficient soldering and LED light damage and the guarantee of normal basic data and voice service flows in the production link, and enhancing the production efficiency and quality. Thus the test reliability is improved, which can better intercept a defective single board and reduce the repair rate of the single board. The cost is saved, and the quality of products is improved.

Though the alternative embodiments of the present document have been disclosed for the purpose of illustration, the people skilled in the art will realize that various improvements, additions and replacements are also possible, therefore, the scope of the present document should not be limited to the above embodiments.

The ordinary person skilled in the art can understand that all or part of steps of the above embodiments can be implemented by using a flow of computer program, the computer program can be stored in a computer readable memory medium, the computer program is executed on corresponding hardware platforms (such as a system, equipment, device and component and so on), and when the program is carried out, one of the steps or a combination of the steps of the method embodiments is included.

Alternatively, all or part of the steps of the above embodiments also can be implemented by using integrated circuits, these steps can be made into multiple integrated circuit modules respectively or multiple modules or steps of them can be made into a single integrated circuit module to be implemented. Therefore, the present document is not limited to any combination of hardware and software in a specific form.

The devices or function modules or function units in the above embodiments can be implemented through a universal calculating device, and they can be concentrated on a single calculating device or distributed in a network consisting of a plurality of calculating devices.

If implemented in a form of software function module and sold or used as an independent product, the devices or function modules or function units in the above embodiments can be stored in a computer readable memory medium. The computer readable memory medium mentioned above can be a read-only memory, magnetic disk or optical disk and so on.

Any skilled people familiar to the art can easily conceive changes or substitutions within the technical scope disclosed by the present document, and these changes and substitutions shall all be covered within the protection scope of the present document. Therefore, the protection scope of the present document should be subject to the protection scope described in the claims.

INDUSTRIAL APPLICABILITY

In the embodiments of the present document, the test reliability can be improved, which can better intercept a defective single board, reduce a repair rate of the single board, save the cost, and improve the quality of products.

What is claimed is:

1. An ageing detection method, comprising:
when a preset temperature environment is reached, constructing a message by testing a local area network, LAN, port, and performing a statistics operation on received packets and transmitted packets to determine a high-temperature dynamic ageing detection result under a data service test;
performing a simulated call protocol flow operation by testing a voice service to determine a high-temperature dynamic ageing detection result under a voice service test; and detecting a Beacon frame by testing a wireless local area networks, WLAN, service to determine a high-temperature dynamic ageing detection result under a WLAN service test.

2. The method of claim 1, wherein, constructing a message by testing a LAN port, and performing a statistics operation on received packets and transmitted packets comprises:
constructing a message with a fixed mac address; sending the message at every specified duration, and making a statistics for received packets and transmitted packets of the message in the meantime;
if the received packets and transmitted packets of the message in the statistics for a current time are unequal, determining that a test is failed within the specified duration; and
if a number of times of continuous detection failures reaches a first specified number of times, determining that a high-temperature dynamic ageing LAN port detection for the current time is failed.

3. The method of claim 2, further comprising:
in a high-temperature dynamic ageing detection process, controlling a network E light to ceaselessly flicker;
after the high-temperature dynamic ageing detection ends, controlling the network E light to be always on and an optical signal light to be off to indicate that the high-temperature dynamic ageing detection result is a success; and
after the high-temperature dynamic ageing detection ends, controlling the optical signal light to be always on to indicate that the high-temperature dynamic ageing detection result is a failure.

4. The method of claim 1, wherein, performing a simulated call protocol flow operation by testing a voice service comprises:
looping two plain old telephone service, pots, ports; wherein, the two pots ports are a pots1 port and a pots2 port, the pots1 port and the pots2 port alternately sends or receives a serial number;
in a case that the pots1 port sends a serial number and the pots2 port receives the serial number, if the serial number received by the pots2 port is entirely matched with an order and a number value of a serial number sent by the pots1 port, determining that the test for a current time is successful, and if the serial number received by the pots2 port is not entirely matched with the order and the number value of the serial number sent by the pots1 port, determining that the test for the current time is failed; and
if a number of times of continuous detection failures reaches a second specified number of times, determining that a high-temperature dynamic ageing detection for a current time is failed.

5. The method of claim 4, further comprising:
in a high-temperature dynamic ageing detection process, controlling a network E light to ceaselessly flicker;
after the high-temperature dynamic ageing detection ends, controlling the network E light to be always on and an optical signal light to be off to indicate that the high-temperature dynamic ageing detection result is a success; and
after the high-temperature dynamic ageing detection ends, controlling the optical signal light to be always on to indicate that the high-temperature dynamic ageing detection result is a failure.

6. The method of claim 1, wherein, detecting a Beacon frame by testing a WLAN service comprises:

scanning the Beacon frame;
if the Beacon frame is detected normally, determining that a high-temperature dynamic ageing detection for a current time is successful; and
if a number of times of continuously not detecting the Beacon frame reaches a third specified number of times, determining that the high-temperature dynamic ageing detection for the current time is failed.

7. The method of claim 6, further comprising:
in a high-temperature dynamic ageing detection process, controlling a network E light to ceaselessly flicker;
after the high-temperature dynamic ageing detection ends, controlling the network E light to be always on and an optical signal light to be off to indicate that the high-temperature dynamic ageing detection result is a success; and
after the high-temperature dynamic ageing detection ends, controlling the optical signal light to be always on to indicate that the high-temperature dynamic ageing detection result is a failure.

8. The method of claim 6, further comprising:
in a high-temperature dynamic ageing detection process, controlling a network E light to ceaselessly flicker;
after the high-temperature dynamic ageing detection ends, controlling the network E light to be always on and an optical signal light to be off to indicate that the high-temperature dynamic ageing detection result is a success; and
after the high-temperature dynamic ageing detection ends, controlling the optical signal light to be always on to indicate that the high-temperature dynamic ageing detection result is a failure.

9. A computer program, embodied on a non-transitory computer readable memory medium, comprising program instructions, wherein, when the program instructions are executed by a computer, the computer may execute the method of claim 1.

10. An ageing detection device, comprising:
a data service test module, arranged to: when a preset temperature environment is reached, construct a message by testing a local area network, LAN, port, and perform a statistics operation on received packets and transmitted packets to determine a high-temperature dynamic ageing detection result under a data service test;
a voice service test module, arranged to: perform a simulated call protocol flow operation by testing a voice service to determine a high-temperature dynamic ageing detection result under a voice service test; and
a wireless local area networks, WLAN, service test module, arranged to: detect a Beacon frame by testing a WLAN service to determine a high-temperature dynamic ageing detection result under a WLAN service test.

11. The device of claim 10, wherein, the data service test module comprises:
a message construction unit, arranged to: construct a message with a fixed media access control mac address;
a message sending unit, arranged to: send the message every specified duration, and make a statistics for received packets and transmitted packets of the message in the meantime; and
a first test determination unit, arranged to: in a case that the received packets and transmitted packets of the message in the statistics for a current time are unequal, determine that a test is failed within the specified duration; and in a case that a number of times of continuous detection failures reaches a first specified number of times, determine that a high-temperature dynamic ageing LAN port detection for the current time is failed.

12. The device claim 11, further comprising: a signal light control unit, arranged to:
    in a high-temperature dynamic ageing detection process, control a network E light to ceaselessly flicker;
    after the high-temperature dynamic ageing detection ends, control the network E light to be always on and an optical signal light to be off to indicate that the high-temperature dynamic ageing detection result is a success; and
    after the high-temperature dynamic ageing detection ends, control the optical signal light to be always on to indicate that the high-temperature dynamic ageing detection result is a failure.

13. The device of claim 10, wherein, the voice service test module comprises:
    a processing unit, arranged to: loop two plain old telephone service, pots, ports; wherein, the two pots ports are a pots1 port and a pots2 port, the pots1 port and the pots2 port alternately sends or receives a serial number; and
    a second test determination unit, arranged to: in a case that the pots1 port sends a serial number and the pots2 port receives the serial number, if the serial number received by the pots2 port is entirely matched with an order and a number value of the serial number sent by the pots1 port, determine that the test for a current time is successful, and if the serial number received by the pots2 port is not entirely matched with the order and the number value of the serial number sent by the pots1 port, determine that the test for the current time is failed; and
    if a number of times of continuous detection failures reaches a second specified number of times, determine that a high-temperature dynamic ageing detection for the current time is failed.

14. The device of claim 13, further comprising: a signal light control unit, arranged to:
    in a high-temperature dynamic ageing detection process, control a network E light to ceaselessly flicker;
    after the high-temperature dynamic ageing detection ends, control the network E light to be always on and an optical signal light to be off to indicate that the high-temperature dynamic ageing detection result is a success; and
    after the high-temperature dynamic ageing detection ends, control the optical signal light to be always on to indicate that the high-temperature dynamic ageing detection result is a failure.

15. The device of claim 10, wherein, the WLAN service test module comprises:
    a frame scanning unit, arranged to: scan the Beacon frame; and
    a third test determination unit, arranged to: in a case that the Beacon frame is detected normally, determine that a high-temperature dynamic ageing detection for a current time is successful; and in a case that the Beacon frame is not detected for a third specified number of times in succession, determine that the high-temperature dynamic ageing detection for the current time is failed.

16. The device of claim 15, further comprising: a signal light control unit, arranged to:
    in a high-temperature dynamic ageing detection process, control a network E light to ceaselessly flicker;
    after the high-temperature dynamic ageing detection ends, control the network E light to be always on and an optical signal light to be off to indicate that the high-temperature dynamic ageing detection result is a success; and
    after the high-temperature dynamic ageing detection ends, control the optical signal light to be always on to indicate that the high-temperature dynamic ageing detection result is a failure.

17. The device claim 15, further comprising: a signal light control unit, arranged to:
    in a high-temperature dynamic ageing detection process, control a network E light to ceaselessly flicker;
    after the high-temperature dynamic ageing detection ends, control the network E light to be always on and an optical signal light to be off to indicate that the high-temperature dynamic ageing detection result is a success; and
    after the high-temperature dynamic ageing detection ends, control the optical signal light to be always on to indicate that the high-temperature dynamic ageing detection result is a failure.

* * * * *